United States Patent [19]

Coutant et al.

[11] Patent Number: 5,582,007
[45] Date of Patent: Dec. 10, 1996

[54] METHOD FOR SMOOTH HYDROSTATIC PUMP/MOTOR TRANSITIONS

[75] Inventors: Alan R. Coutant, Chillicothe; Sanjay Rajagopalan, Peoria, both of Ill.

[73] Assignee: Caterpillar Inc., Peoria, Ill.

[21] Appl. No.: 439,072

[22] Filed: May 11, 1995

[51] Int. Cl.$^6$ .................................. F16D 39/00
[52] U.S. Cl. ................... 60/327; 60/491; 475/76
[58] Field of Search ................ 60/327, 490, 491; 475/76, 80

[56] References Cited

U.S. PATENT DOCUMENTS

| | | | |
|---|---|---|---|
| 3,901,031 | 8/1975 | Knapp et al. | 60/490 |
| 4,203,293 | 5/1980 | Bubula et al. | 60/490 |
| 4,983,149 | 1/1991 | Kita | 475/76 |

*Primary Examiner*—F. Daniel Lopez
*Attorney, Agent, or Firm*—J. W. Burrows

[57] ABSTRACT

A method is disclosed for providing a smooth power transition between a variable displacement pump and a variable displacement motor when a mechanical feedback is not provided. The method includes sensing and comparing the speeds of the variable displacement pump and the variable displacement motor based on known maximum volumetric displacements and reducing the rate of change of displacement of one of the variable displacement pump or the variable displacement motor when it is determined that the one is near its maximum displacement position and simultaneously initiating a change in displacement of the other thereof. The subject arrangement ensures that there is no detrimental interruptions of power during the transition of changing of displacement of one of the variable displacement pump and the variable displacement motor to changing the displacement of the other one thereof.

6 Claims, 2 Drawing Sheets

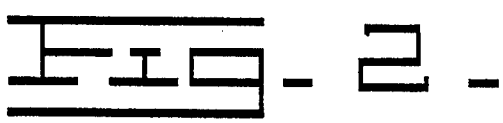
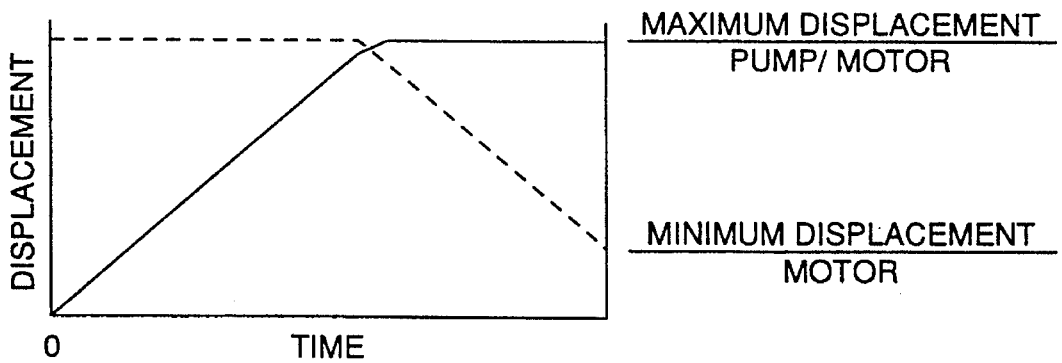
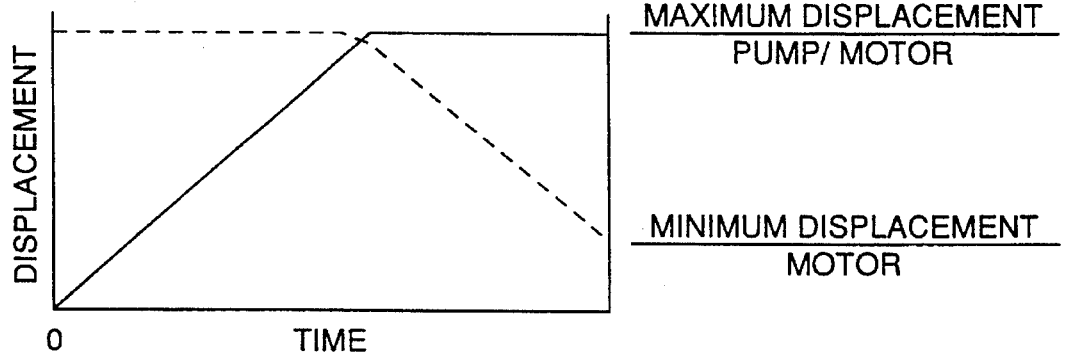
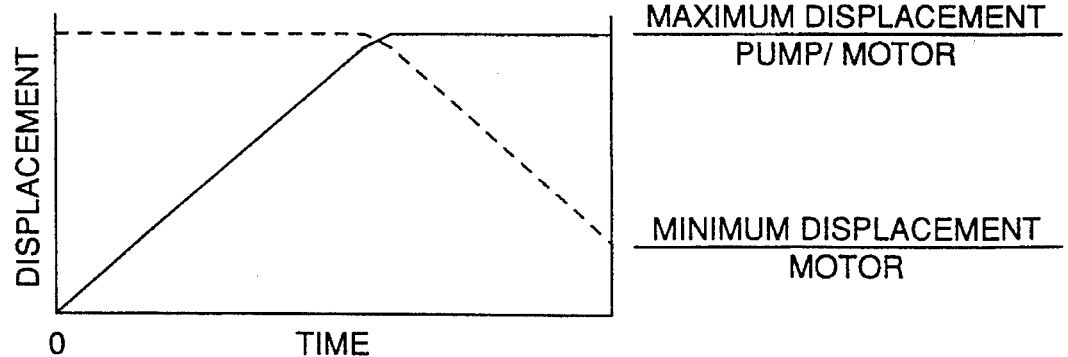

METHOD FOR SMOOTH HYDROSTATIC PUMP/MOTOR TRANSITIONS

DESCRIPTION

TECHNICAL FIELD

This invention relates generally to the transition between the changing of displacement of a pump to the changing of displacement of a motor in a hydrostatic system and more particularly to a method of providing a smooth transition therebetween.

BACKGROUND ART

Known hydrostatic systems utilize mechanical feedback mechanisms to indicate that the respective one of the variable displacement pump or the variable displacement motor has reached its maximum displacement position and the other one thereof is ready to initiate a change in displacement to continue the power distribution therefrom. Known feedback mechanism are normally bulky in shape and not readily reliable due to various mechanical connection therein. Other systems have used sensors to determine the relative speeds of system components to provide input data to a microprocessor which in turn is used for various system controls. Other systems normally allow the variable displacement pump to fully reach its maximum displacement position prior to initiating a change in the displacement of the variable displacement motor. This results in a noticeable interruption of power which may result in a "pause" or "jerk" in the operation of the machine. Either of these occurrences is objectionable to the operator and are also detrimental to the efficient operation of the machine.

The present invention is directed to overcoming one or more of the problems as set forth above.

DISCLOSURE OF THE INVENTION

In one aspect of the present invention a method is disclosed for providing a smooth transition of power when switching between the changing of displacement of a hydrostatic variable displacement pump and a variable displacement motor in the absence of mechanical feedback mechanisms. The method includes the steps of sensing the speed of the variable displacement pump, sensing the speed of the variable displacement motor, calculating the instant displacement of the respective variable displacement pump or the variable displacement motor being changed based on the sensed speeds thereof and its known maximum volumetric displacements, and reducing the rate of change to substantially zero of the variable displacement pump or the variable displacement motor being changed and simultaneously initiating a predetermined rate of change to the displacement of the other variable displacement pump or variable displacement motor.

The present inventions provides a method which ensures smooth power transition between the change in displacement of one of the variable displacement pump or the variable displacement motor to the change in displacement of the other one thereof. This offsets any undesirable "pause" or "jerk" of the machine and provides an efficient operating system.

BRIEF DESCRIPTION OF THE DRAWINGS

FIG. 2 graphically illustrates an embodiment of the subject invention during one mode of operation;

FIG. 3 graphically illustrates the embodiment of the subject invention during another mode of operation; and FIG. 4 graphically illustrates an embodiment combining both modes of operation set forth in FIGS. 2 and 3.

BEST MODE FOR CARRYING OUT THE INVENTION

Figure 1:
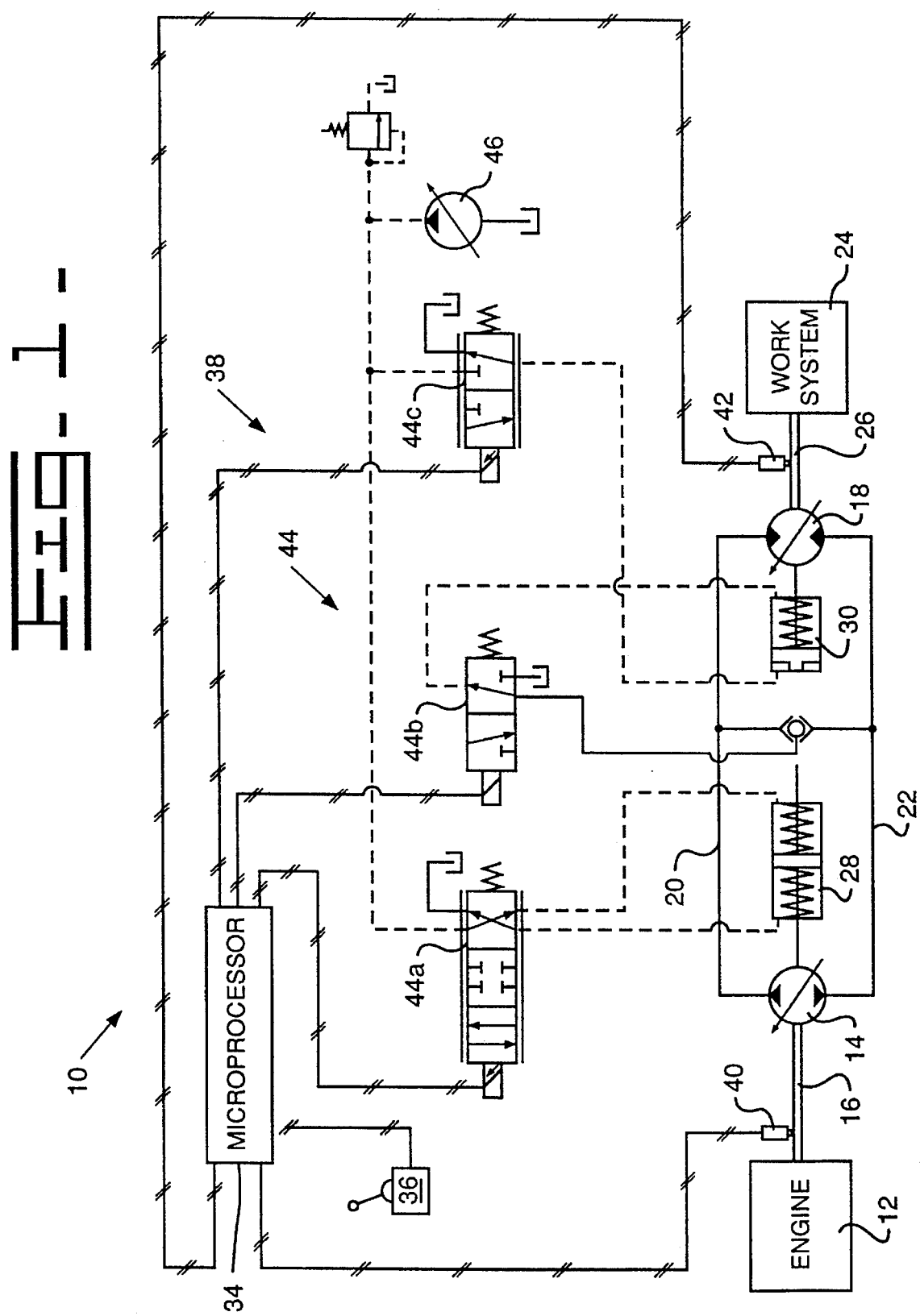
FIG. 1 schematically and diagrammatically illustrates a hydrostatic system which utilizes the subject method.

Referring to FIG. 1 of the drawing, a hydrostatic system 10 is illustrated. The hydrostatic system 10 includes a source of power, such as an engine 12 drivingly connected to a variable displacement pump 14 by a pump input shaft 16. A variable displacement motor 18 is fluidly connected to the variable displacement pump 12 by conduits 20,22. A work system 24 is drivingly connected to the variable displacement motor 18 by an output shaft 26. A first displacement controller 28 controls the displacement of the variable displacement pump 14 and a second displacement controller 30 controls the displacement of the variable displacement motor 18.

The hydrostatic system 10 also includes a microprocessor 34 having an input controller 36 and a control arrangement 38. The control arrangement 38 includes a first speed sensor 40 operatively associated with the pump input shaft 16 to deliver a signal representative of the speed of the variable displacement pump 14 to the microprocessor 34. A second speed sensor 42 is operatively associated with the motor output shaft 26 to deliver a signal representative of the speed of the variable displacement motor 18 to the microprocessor 34. The microprocessor compares the sensed speeds of the variable displacement pump 14 and the variable displacement motor 18 relative to the command from the input controller 36 and delivers needed signals to a valve mechanism 44 to direct pressurized fluid from a source of pressurized fluid, such as a pilot pump 46, to the respective displacement controllers 28,30 to change the displacement of the respective variable displacement pump 14 and the variable displacement motor 18 as needed to satisfy the input command from the input controller 36. The valve mechanism 44 includes a first valve 44a operative to control movement of the displacement controller 28 of the pump 14, a second valve 44b operative to direct the highest pressure in the conduits 20,22 to the displacement controller 30, and a third valve 44c operative to control movement of the displacement controller 30 of the motor 18.

FIG. 2 illustrates the relationship of the displacements of the variable displacement pump 14 and the variable displacement motor 18 relative to time during an increase in speed of the output shaft 26. Note the change in displacement as the pump approaches maximum displacement. The solid line represents the displacement of the variable displacement pump 14 and the dashed line represents the displacement of the variable displacement motor 18. It is well known that the displacement of the variable displacement motor 18 would not be changed to a zero displacement. This is based on the well known fact that if a fluid motor is reduced to zero displacement, the output shaft thereof would be at an infinite speed level.

FIG. 3 illustrates the relationship of the respective displacements of the variable displacement motor 18 and the variable displacement pump 14 during a decrease in speed of the output shaft 26. Note the change in displacement of the motor 18 as it approaches maximum displacement. As with FIG. 2, the solid line represents the displacement of the variable displacement pump and the dashed line represents the displacement of the variable displacement motor 18.

FIG. 4 illustrates a graph that is similar to FIGS. 3 and 4 but differs in that during an increase in the speed of the output shaft 26 as the pump 14 approaches its maximum position and a change in displacement is initiated, the displacement of the motor 18 begins to reduce at an initial slow rate and changes to a second higher rate of change subsequent thereto. Likewise, as the speed of the output shaft 26 decreases, the rate of change of the motor 18 is slowed as it approaches its maximum displacement position and substantially at the same time, the displacement of the pump 14 is lowered at an initial slow rate and changes to a second higher rate of change subsequent thereto.

INDUSTRIAL APPLICABILITY

In the operation of the subject embodiment, an input command is made to the input controller 36 by the operator. The microprocessor 34 receives the command signal and generates a signal to the valve 44a which controllably directs pressurized fluid to the displacement controller 28 to initiate a change in displacement of the variable displacement pump 14. Pressurized fluid is directed through one of the conduits 20,22 to the variable displacement motor 18 and return flow is directed from the variable displacement motor 18 back to the variable displacement pump 14 through the other of the conduits 20,22. Pressurized fluid directed to the variable displacement motor 18 causes it to rotate the output shaft 26. During the change of displacement of the variable displacement pump 14, the displacement of the variable displacement motor 18 is maintained at its maximum displacement position, as illustrated, by both spring force and the force of the highest pressure in the conduits 20,22 being directed thereto through the valve 44b. This is more clearly illustrated by the angled portion of the solid line of FIG. 2.

As long as the displacement of the variable displacement pump 14 continues to change, the speed of the motor output shaft 26 continues to increase in proportion to the change in displacement of the variable displacement pump 14. Since the first and second speed sensors 40,42 is continuously sensing the speed of the pump input shaft 16 and the motor output shaft 26 and knowing the volumetric displacement of the variable displacement pump 14, the microprocessor 34 computes the relative position of the displacement mechanism within the variable displacement pump 14 between its minimum and maximum positions. The percent of error is based on the degree of fluid leakage within the variable displacement pump 14 and the variable displacement motor 18. The microprocessor 34 estimates the degree of leakage and compensates therefor. Once the displacement controller 28 has moved to a near maximum displacement position, a signal is directed through the valve 44a to reduce the rate of change of displacement thereof to near zero This change in displacement is better illustrated by the second angled slope of the solid line of FIG. 2. Simultaneously, the microprocessor directs a signal to the valve 44b to block the flow of pressurized fluid therethrough and directs a signal to the valve 44c to initiate a predetermined rate of change in the displacement of the variable displacement motor 18, as is clearly illustrated by the dashed line of FIG. 2. As the variable displacement motor 18 continues to reduce in displacement, the speed of the motor output shaft 26 continues to increase. During this transition, there is no sudden changes in the power being delivered to the motor output shaft 26. Consequently, the operator does not notice any objectionable "pauses" or "jerks" during the transition. Once the displacement change to the variable displacement motor 18 is initiated, the variable displacement pump 14 is allowed to slowly continue to move until it reaches its maximum displacement position.

When it is desired to slow the machine from a high speed to a low speed, the microprocessor 34 detects when the displacement of the variable displacement motor 18 nears its maximum displacement position and directs a signal through the valve 44c to reduce the rate of change of the displacement thereof to near zero as is illustrated by the dashed line of FIG. 3. Simultaneously, the microprocessor 34 directs a signal through the valve 44a to initiate a predetermined rate of change of displacement in the variable displacement pump 14, as is clearly illustrated by the solid line in FIG. 3. As the displacement of the variable displacement pump 14 continues to decrease, the displacement of the variable displacement motor 18 slowly continues to its maximum displacement position. As noted above, during this transition, the operator is not subjected to any "pauses" or "jerks".

Additionally, a smooth transition can be achieved by the microprocessor 34 continuously monitoring the speed of the output shaft 26 during a speed increase or decrease and when there is no change in speed of the output shaft 26 for a predetermined number of microprocessor loops, the microprocessor directs the needed signals to control the respective controllers 28,30. During an increase in speed, the microprocessor directs the signal to the valve 44c to initiate the predetermined rate of change in displacement of the variable displacement motor 18 while maintaining the variable displacement pump 14 at its maximum position. During a decrease in speed, the microprocessor 34 directs a signal to the valve 44a to initiate the predetermined rate of change in displacement of the variable displacement pump 14 while maintaining the variable displacement motor 18 in its maximum displacement position.

Additionally, the microprocessor 34 can adaptively control the transition in order to maintain a smooth transition. In order to accomplish the adaptive control, the microprocessor 34 monitors each transition and stores the degree of shift "harshness" for each transition. From an average of a predetermined number of transitions, the microprocessor 34 can adjust the timing of the respective signals in order to initiate the predetermined rate of change in displacement sooner or later depending on the stored average.

Thus the method of providing a smooth transition of power when switching between the changing of displacement of a hydrostatic variable displacement pump 14 and a variable displacement motor 18 comprises the steps of sensing the speed of the variable displacement pump 14, sensing the speed of the variable displacement motor 18, calculating the instant displacement of the respective variable displacement pump 14 or the variable displacement motor 18 being changed based on the sensed speeds thereof and its known maximum volumetric displacement, and reducing the rate of change to the displacement of the other variable displacement pump 14 or the variable displacement motor 18. The method further includes reducing the rate of change of the variable displacement pump 14 or the variable displacement motor 18 just prior to the maximum displacement thereof being reached and terminating the rate change once the displacement thereof reaches its maximum position and holding the other of the variable displacement pump 14 or the variable displacement motor 18 in its maximum displacement position during the changing of the displacement of the one thereof. The method also includes the step of continuously monitoring the harshness of each power transitions between the variable displacement pump 14 and the variable displacement motor 18 and averaging the harshness of the predetermined number of previous power transitions and adjusting the timing of the reducing of the rate of change of the variable displacement pump 14 or the variable displacement motor 18 to compensate for internal fluid leakage. Additionally, the method includes the step of continuously comparing the speeds of the variable displacement pump 14 and the variable displacement motor 18 as the displacement of one of them thereof is being changed and when the speed of the other one thereof does not change over a predetermined period of microprocessor loops the change of displacement of the one is terminated and the change in displacement of the other is simultaneously initiated.

In view of the foregoing, it is readily apparent that the subject method provides a process that ensures a smooth transition between changing displacement of the variable displacement pump to changing displacement of the variable displacement motor and vice versa without subjecting the operator or the machine to "pauses" or "jerks" that are normally present during such transitions.

Other aspects, objects and advantages of this invention can be obtained from a study of the drawings, the disclosure and the appended claims.

We claim:

1. A method for providing a smooth transition of power between a variable displacement pump and a variable displacement motor in a fluid drive system that controls an output speed thereof by respectively changing the displacements of the variable displacement pump and the variable displacement motor between their respective minimum and maximum displacement positions when the fluid drive system is free of mechanical feedback mechanisms, comprising the steps of:

sensing a speed of the variable displacement pump;

sensing a speed of the variable displacement motor;

changing the displacement of one of the variable displacement pump and variable displacement motor at a first predetermined rate;

calculating a instant displacement of the one of the variable displacement pump and the variable displacement motor based on the sensed speed thereof and its known maximum volumetric displacement; and reducing the rate of change of the one of the variable displacement pump and the variable displacement motor being changed from the first predetermined rate to a second smaller predetermined rate of change for a predetermined time and then to substantially zero and simultaneously initiating a predetermined rate of change to the displacement of the other of the variable displacement pump and the variable displacement motor.

2. The method of claim 1 wherein the step of reducing the rate of change of the one of the variable displacement pump and the variable displacement motor includes reducing the rate of change thereof when a difference between its displacement and its maximum displacement is a predetermined difference and terminating the reduced rate of change once the displacement thereof reaches its maximum displacement.

3. The method of claim 2 including the step of holding the other of the variable displacement pump and the variable displacement motor in its maximum displacement position during the changing of the displacement of the one of the variable displacement pump and the variable displacement motor.

4. The method of claim 3 including the step of detecting a harshness in the power transition between the variable displacement pump and the variable displacement motor and continuously monitoring the harshness of each power transition.

5. The method of claim 4 including the step of averaging the harshness of a predetermined number of previous power transitions and adjusting the predetermined difference of the reducing of the rate of change of the variable displacement pump or the variable displacement motor to compensate for internal fluid leakage.

6. The method of claim 1 including the step of continuously comparing the speeds of the variable displacement pump and the variable displacement motor as the displacement of one of them thereof is being changed and when the speed of the other one thereof does not change over a predetermined period of time the change of displacement of the one is terminated and the change in displacement of the other is simultaneously initiated.

* * * * *